Aug. 21, 1928.

A. P. MILLER ET AL 1,681,592

DISPENSING DEVICE

Filed Sept. 27, 1926

Inventors
Arthur Persons Miller
Daniel Sinkel
by Frank Schraeder Jr
Attorney.

Patented Aug. 21, 1928.

1,681,592

UNITED STATES PATENT OFFICE.

ARTHUR PERSONS MILLER AND DANIEL SIAKEL, OF CHICAGO, ILLINOIS.

DISPENSING DEVICE.

Application filed September 27, 1926. Serial No. 137,943.

This invention relates to new and useful improvements in dispensing devices embodying a material storage container and means for successively discharging a predetermined quantity of the material from the storage container. The device herein shown and described is particularly adaptable for use for granular or powdered materials as for instance powdered soap, salt and the like.

It is among the objects of the invention to provide a dispensing device of the above character which shall be comparatively simple in construction, efficient in operation and low in cost of manufacture.

Another object of the invention is found in the provision of a material storage container arranged to discharge the materials therefrom by gravity and reciprocating means for controlling the discharge of a predetermined quantity of material from the container.

A further object of the invention resides in the provision of a disk-like plate having a plurality of portions thereof bent upwardly above and angularly to the upper surface thereof to thereby provide a plurality of angularly disposed scrapers or knife-like edges which upon the reciprocation of the disk-like plate, will scrape a predetermined quantity of the material and forcibly discharge same through the openings formed in the disk-like plate under the bent up scraper portions.

A still further object of the invention is found in the means for adjustably controlling the quantity of the material which is discharged upon each reciprocation.

With the above and other objects in view, our invention consists in the combination, construction and relative arrangement of the parts and members shown in the accompanying drawing, described in the following specification, and particularly pointed out in the appended claim.

Referring to the illustrations which show one embodiment of our invention:

Referring to the illustrations in detail, the material storage container 10 is preferably formed of a cylindrical shell 10$^A$ provided with a removable cover 11 of any suitable construction at its upper end. The lower end of the storage container 10 is provided with a discharge hopper 12 comprising an annular portion 12$^A$ which is securely fastened to the lower end of the cylinder 10$^A$ by screws 13 and which portion 12$^A$ is formed with an integral frusto-conical discharge spout 12$^B$ having a discharge opening 12$^C$.

Figure 1:
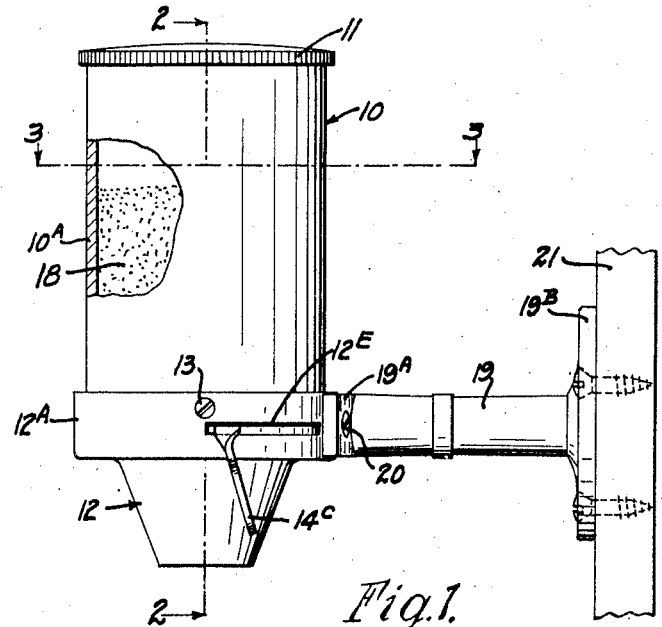
Fig. 1, is a side elevation of a device embodying our invention.
Figure 2:
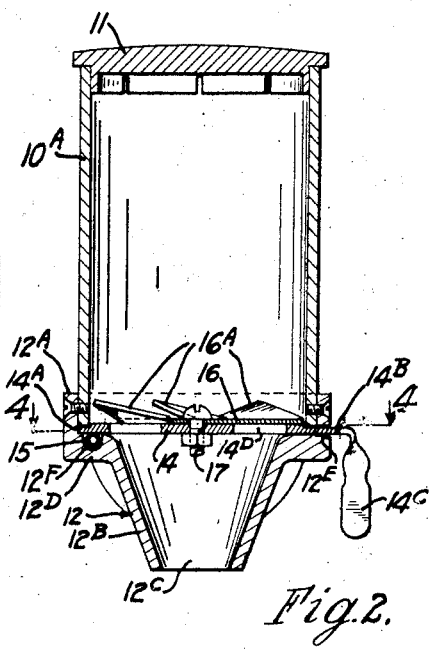
Fig. 2, is a vertical section taken on line 2—2 of Fig. 1.
Figure 3:
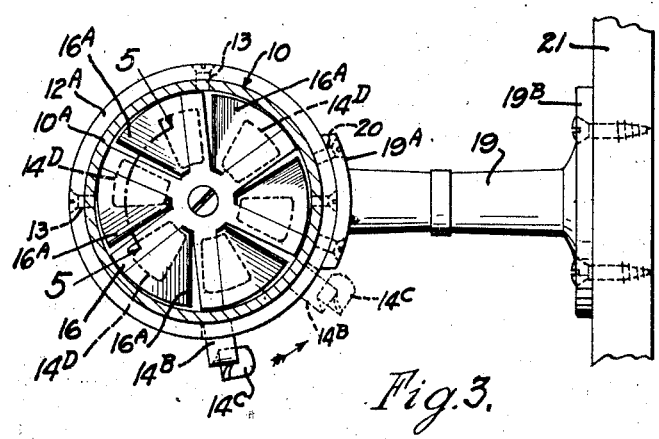
Fig. 3, is a cross section taken on line 2—2 of Fig. 1.
Figure 4:
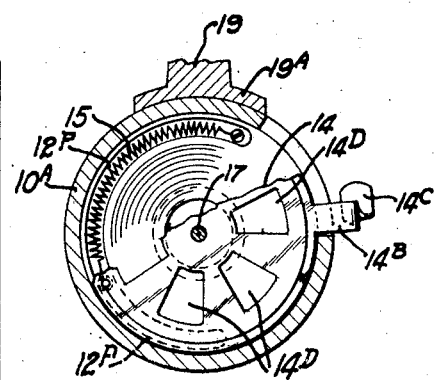
Fig. 4, is a cross section taken on line 4—4 of Fig. 2, with a portion of the feed plate broken away to show the spring for actuating same in one direction.
Figure 5:
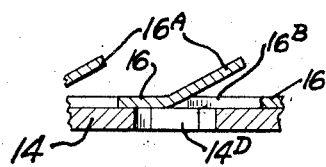
Fig. 5, is an enlarged section taken on line 5—5 of Fig. 3, showing the cutting blade and the partially aligned openings in the two adjacent plates.

By reference to Figure 2, it will be clearly seen that an annular groove is provided between the lower edge of the cylinder 10$^A$ and the inner face of the lateral portion 12$^D$, in which is cut a peripheral portion 14$^A$ of lesser thickness to provide contact with the lower end of the cylinder and also the inner face thereof, thus affording a suitable seal against leakage of the material around the plate edge.

The plate 14 is also stamped with an integral operating arm 14$^B$, the end portion thereof being bent downwardly to form an operating handle 14$^C$. The arm 14$^B$ extends through a slot 12$^E$ formed in the side of the hopper 12.

A groove 12$^F$ is provided for a suitable coil spring 15, one end of which is secured to the portion 12$^D$ and the other end to the disk 14, thus providing resilient means for returning the disk 14 to its normal position upon reciprocation by the handle 14$^C$.

The plate or disk 14 is provided with a plurality of radially disposed openings 14$^D$ which gradually increase in width toward the periphery of the disk.

A feed disk 16 is mounted upon the disk 14 and securely fastened thereto by means of the bolt 17. The feed disk 16 fits within close proximity of the inner face of the cylinder 10$^A$ and is fabricated with a plurality of radial slots to permit the bending on radial lines of the disk portions 16$^A$ upwardly and angularly to the upper face of the disk to thereby provide angularly disposed cutting blades 16$^A$.

It will now be readily apparent that when the handle 14$^C$ of the arm 14$^B$ is moved laterally against the tension of the spring 15, both disks 14 and 16 by reason of the connection through bolt 17 will be moved together and the blades 16^A will cut into the mass of material 18, and because of the inclination of the blades 16^A, will cause a discharge of the material through the openings 16^B below the blades 16^A and through the aligned or partially aligned openings 14^D into the hopper 12 through the opening 12^C. Upon the release of the handle 14^C the plates 14 and 16 will be returned to normal position by the spring 15.

It is obvious that the bolt 17 may be moved and the plate openings 14^D and 16^B adjusted relatively to vary the amount of material discharged therethrough.

We claim:

In a dispensing device, and in combination, a material storage container, means for causing and controlling the gravity discharge of the material from said container, comprising a pair of adjacently mounted coacting plates at the lower end of said container, and means for imparting movement to said plates, the upper of said plates having a plurality of blades forming integral portions thereof and being bent upwardly and angularly to the upper surface of said upper plate to provide openings beneath said blades, the lower of said plates having a plurality of openings therein, the upper of said plates being adjustable relatively to said lower plate to vary the relative alignment of the openings in said plates.

In witness whereof we affix our signatures.

ARTHUR PERSONS MILLER.
DANIEL SIAKEL.